United States Patent
Solomon et al.

(10) Patent No.: US 10,731,427 B2
(45) Date of Patent: *Aug. 4, 2020

(54) SYSTEM AND METHOD FOR HANDLING DRILL PIPE USING A VACUUM HANDLER

(71) Applicant: Vacuworx Global, LLC, Tulsa, OK (US)

(72) Inventors: William J. Solomon, Tulsa, OK (US); Justin Hendricks, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,365

(22) Filed: Mar. 11, 2019

(65) Prior Publication Data

US 2019/0277097 A1 Sep. 12, 2019

Related U.S. Application Data

(63) Continuation of application No. 15/899,166, filed on Feb. 19, 2018, now Pat. No. 10,227,835, which is a
(Continued)

(51) Int. Cl.
*E21B 19/15* (2006.01)
*B66C 1/02* (2006.01)
(Continued)

(52) U.S. Cl.
CPC ........... *E21B 19/14* (2013.01); *B25J 15/0625* (2013.01); *B66C 1/02* (2013.01); *E21B 19/15* (2013.01); *E21B 19/155* (2013.01)

(58) Field of Classification Search
CPC ........ E21B 19/15; E21B 19/155; E21B 19/00; E21B 19/14; B66C 1/02; B25J 15/06–0691
(Continued)

(56) References Cited

U.S. PATENT DOCUMENTS 3,145,786 A * 8/1964 O'Neill ................... E21B 19/15
173/28
4,604,026 A * 8/1986 Barrett ................. B25J 15/0616
414/728
(Continued)

FOREIGN PATENT DOCUMENTS

AU 2012201885 A1 10/2012
WO 0073176 A2 12/2000

OTHER PUBLICATIONS

Vacuworx, "HDD Pipe Handling System", "URL:http://www.vacuworx.com/pdfvacuworxdrillstem.pdf", Feb. 20, 2014.
(Continued)

*Primary Examiner* — George S Gray
(74) *Attorney, Agent, or Firm* — Gable Gotwals

(57) ABSTRACT

A system and method for moving directional drill pipe with vacuum power. The system is used with a vacuum beam mounted on a boom. It has a vacuum pad that is pivotally attached at one end by a hinge to the vacuum beam. The other end of the vacuum pad is attached to the vacuum beam via an actuatable cylinder. Operation of the cylinder causes the vacuum pad to rotate about the hinge and change the angle of the vacuum pad relative to the vacuum beam. Lateral movement of the vacuum pad relative to the vacuum beam is provided by one or more pinned connections located adjacent to the hinge. Vacuum pressure from the vacuum pad is used to grasp and release drill pipe.

18 Claims, 2 Drawing Sheets

Related U.S. Application Data continuation of application No. 14/682,246, filed on Apr. 9, 2015, now Pat. No. 9,896,892.

(60) Provisional application No. 61/978,437, filed on Apr. 11, 2014.

(51) Int. Cl.
*E21B 19/14* (2006.01)
*B25J 15/06* (2006.01)

(58) Field of Classification Search
USPC ......... 175/52, 85; 166/379; 414/22.51–22.71
See application file for complete search history.

(56) References Cited

U.S. PATENT DOCUMENTS

| | | | |
|---|---|---|---|
| 4,728,135 A * | 3/1988 | Sugimura | B25J 15/0616 29/743 |
| 2008/0066964 A1 | 3/2008 | Hartke et al. | |

OTHER PUBLICATIONS

Underground Construction, "New Products Introduced at UCT 2014", "https://ucononline.com/2014/03/24/new-products-introduced-at-uct-2014", Mar. 2014, vol. 69, No. 3.

* cited by examiner

SYSTEM AND METHOD FOR HANDLING DRILL PIPE USING A VACUUM HANDLER

CROSS-REFERENCE TO PENDING APPLICATIONS

The present application is a continuation of pending U.S. patent application Ser. No. 15/899,166, filed Feb. 19, 2018, which was a continuation of U.S. patent application Ser. No. 14/682,246, filed on Apr. 9, 2015, U.S. Pat. No. 9,896,892, which claimed the benefit of U.S. Provisional Patent Application No. 61/978,437, filed Apr. 11, 2014, which are incorporated herein by reference.

FIELD OF THE INVENTION

The present invention relates generally to a vacuum handler for pipe. More particularly, the present invention relates to a vacuum handler for drill pipe.

BACKGROUND OF THE INVENTION

Directional drilling machines are typically used to install pipe under existing obstacles such as a river or road. During the operation, the directional drilling machine drills a hole that arches underneath the obstacle from the surface on one side of the obstacle to the surface on the other side of the obstacle. On the initial pass, the directional drilling machine drills the hole. Various methods are used to locate and guide the drill bit and drill string along the desired path. Lengths of drill pipe are added at the back end of the drill string as the drill bit progresses along its path. Once the drill bit reaches the surface on the other side of the obstacle the pipe that is to be installed is attached to the drill string and it is pulled into place as the drill string is retracted through the hole that was just drilled. If the diameter of the pipe is larger than the diameter of the initial hole, the diameter of the initial hole can be increased by reaming it out as the pipe and drill string are retracted back through the hole. As the drill string is retracted back through the hole the excess lengths of drill pipe are removed from the drill string.

Directional drilling requires handling of the drill pipe prior to being secured to the drill string and once it is removed from the drill string. In order to place the drill pipe into position it must be aligned with the end of the drill string. This requires the pipe to be at a slight angle to the ground, typically 1° to 30°. The drill pipe was previously handled in numerous ways using slings, chains, hoists, grappling claws and even moving by hand on smaller diameter pipe. Each of these methods has its own drawbacks ranging from operator safety to damage to the pipe resulting from mishandling.

What is needed, therefore, is an effective and safe way to handle the drill pipe that does not damage it.

BRIEF SUMMARY OF THE INVENTION

The present invention achieves its objectives by providing a system and method for moving directional drill pipe with vacuum power. The system is used with a vacuum beam mounted on a boom. It has a vacuum pad that is pivotally attached at one end by a hinge to the vacuum beam. The other end of the vacuum pad is attached to the vacuum beam via a hydraulic cylinder. Operation of the hydraulic cylinder causes the vacuum pad to rotate about the hinge and change the angle of the vacuum pad relative to the vacuum beam. Lateral movement of the vacuum pad relative to the vacuum beam is provided by one or more pinned connections located adjacent to the hinge. Vacuum pressure from the vacuum pad is used to grasp and release drill pipe.

The present invention provides a system and method to handle drill pipe for directional drilling which minimizes worker injuries and damage to drill pipe and equipment.

BRIEF DESCRIPTION OF THE DRAWINGS

Preferred embodiments of the invention have been described. Other features, aspects, and advantages of the present invention will become better understood with regard to the description, appended claims, and accompanying drawings (which are not to scale) where:

DETAILED DESCRIPTION OF THE INVENTION

Figure 1:
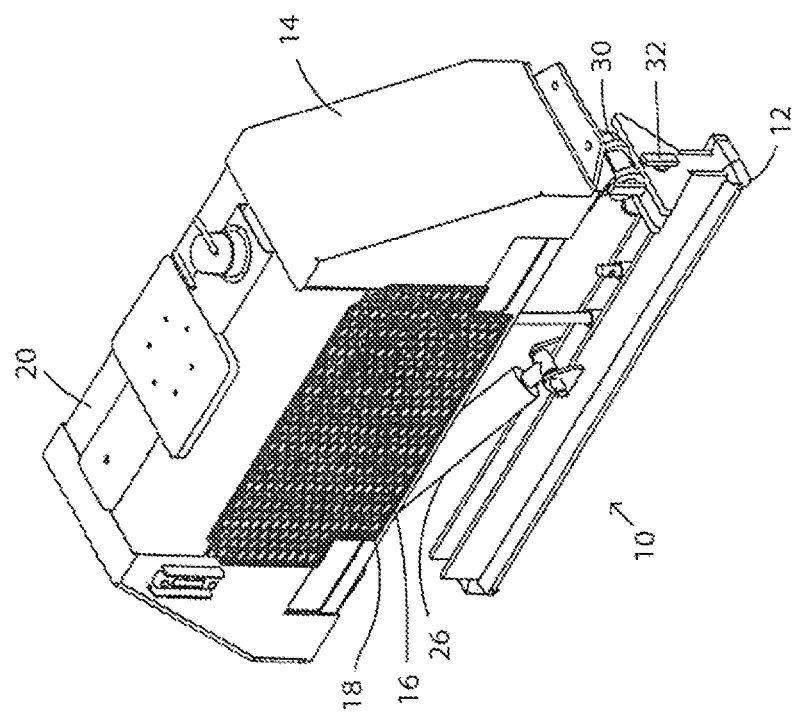
FIG. 1 is a perspective view of one embodiment of the present invention mounted to a vacuum beam.
Figure 5:
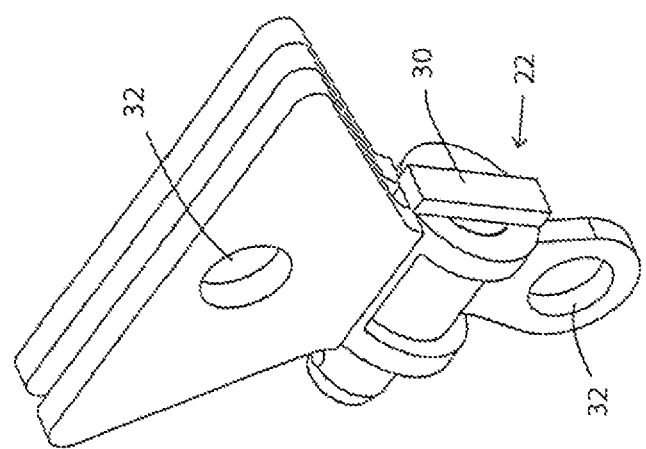
FIG. 5 is a perspective view of one embodiment of articulated link of the present invention.
Figure 4:
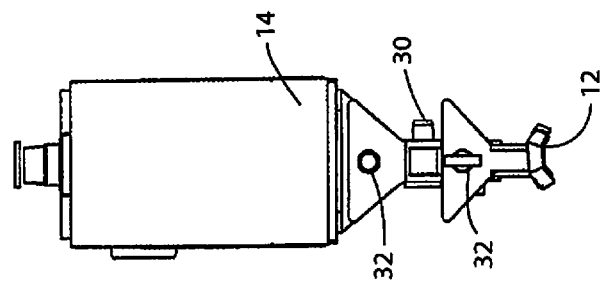
FIG. 4 is a right end view of FIG. 2.

The present invention provides safe and effective system 10 and method for handling drill pipe for a directional drilling machine using a vacuum pad 12 mounted on an excavator or other boom. The vacuum pad 12 is mounted to a vacuum beam 14 which is mounted to the boom of an excavator or other boom (not shown). The connection of the beam 14 to the excavator is typically accomplished with a rotator (not shown) capable of rotating the beam 14 relative to the boom.

Vacuum for the pad 12 is supplied by a vacuum pump 16 mounted on the beam 14. The vacuum pump 16 may be powered by an internal combustion engine 18 located on the beam 14. In the alternative, the vacuum pump 16 may be powered by a hydraulic pump which in turn is powered by hydraulic fluid from the excavator.

The beam 14 also contains a vacuum reservoir 20 which is in fluid communication with the vacuum pump 16 and the vacuum pad 12. This provides additional time for the operator to react to an event where operation of the vacuum pump 16 is interrupted.

Figure 2:
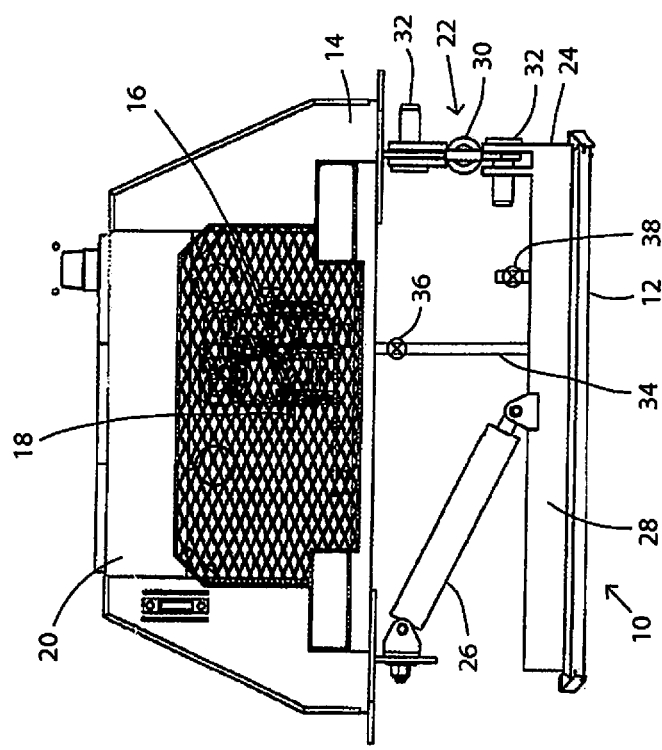
FIG. 2 is a side view of one embodiment of the present invention mounted to a vacuum beam.
Figure 3:
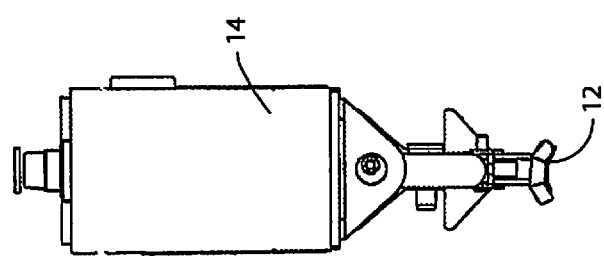
FIG. 3 is a left end view of FIG. 2.

The vacuum pad 12 is attached to beam 14 by harness 22 that is articulated at a first half 24 and has a hydraulic cylinder 26 on the second half 28. The angle of the pad 12 (and any pipe it may be carrying) relative to the beam 14 can be adjusted by operation of the hydraulic cylinder 26. As can be seen in FIGS. 1 and 2, the hydraulic cylinder 26 does not need to be located on the very end of the second half 28 of the pad 16 as shown in FIGS. 1 and 2. Likewise the pinned connection 32 may not be on the very end the pad 12. The exact location of where the hydraulic cylinder 26 and pinned connection 32 is mounted to the pad 12 is a function of the size of the hydraulic cylinder 26 and the amount of load anticipated on the pad 12.

Operation of the hydraulic cylinder 26 causes the vacuum pad 12 to pivot about a hinge 30. Thus the angle of the vacuum pad 12 relative to the vacuum beam 14 can be adjusted.

Slight lateral angle adjustments can be accommodated by one or more pinned connections 32 or other articulations in the harness 22. In the preferred embodiment, these one or more pinned connections are perpendicular with the hinge

30. This assures the pad 12 can be aligned with the pipe being picked up. In the preferred embodiment, this lateral angle adjustment is not actively controlled. Rather it reacts to movement of the pad 12 and beam 14 relative to the pipe being picked up.

A vacuum line 34 connects the pad 12 to the vacuum pump 16 and vacuum reservoir 20. Thus all three of these elements are in fluid communication with one another. A first solenoid operated valve 36 provides a way to isolate the vacuum pad 16 from the vacuum pump 16 and vacuum reservoir 20. A second solenoid operated valve 38 is capable of opening the vacuum pad 16 to atmosphere. This releases the vacuum pressure between the vacuum pad and the drill pipe.

In operation, the drill pipe is typically stored in a horizontal orientation. The excavator operator lowers the vacuum beam 14 and vacuum pad 12 over the drill pipe. Using the rotator the vacuum pad 12 is rotated to align it with the drill pipe. The vacuum pad 12 is then brought into contact with the drill pipe. A vacuum seal is created between the vacuum pad 12 and the drill pipe. This is accomplished by opening the first solenoid operated valve 36 which brings the vacuum pump 16 and/or vacuum reservoir 20 into fluid communication with the vacuum pad 12. Once the drill pipe is secured to the vacuum pad 12 by the vacuum pressure, the vacuum beam 14, vacuum pad 12 and drill pipe are lifted and moved into position with the directional drilling machine through movement of the boom and rotator. The angle of the drill pipe relative to the vacuum beam 14 and ground is then adjusted by extending the hydraulic cylinder 26. This causes the vacuum pad 12 and pipe to rotate about the hinge 30.

Once the directional drilling machine secures the pipe, the pipe is released from the vacuum pad 12. This is accomplished by closing the first solenoid operated valve 36 between the pad 12 and the vacuum pump 16 and vacuum reservoir 20. A second solenoid operated valve 38 on the vacuum pad 12 is then opened to atmosphere. This terminates the vacuum between the vacuum pad 12 and the pipe.

Retrieving a pipe from the directional drilling machine and moving it to storage is accomplished in the reverse order of events.

Articulation and movement of the pad 12 relative to the beam 14 could be accomplished by other means and still be within the scope of this invention. Further the location of power and vacuum sources could be rearranged and still be within the scope of this invention.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A vacuum handler comprising:
   a harness including a hinge and one or more pinned connections, the harness configured for connecting one portion of a vacuum pad of the vacuum handler to a vacuum beam of the vacuum handler, wherein the harness is capable of varying an angle of the vacuum pad relative to the vacuum beam; and
   an actuatable cylinder connecting another portion of the vacuum pad to the vacuum beam, wherein operation of the actuatable cylinder rotates the vacuum pad about the hinge.

2. A vacuum handler according to claim 1, wherein a plane of rotation of the hinge is oriented perpendicular to a plane of rotation of the one or more pinned connections.

3. A vacuum handler according to claim 1, wherein the one or more pinned connections provide lateral movement of the vacuum pad relative to the vacuum beam.

4. A vacuum handler according to claim 1, the actuatable cylinder including a hydraulic cylinder.

5. A vacuum handler according to claim 1, wherein the vacuum beam is a boom-mountable vacuum beam.

6. A vacuum handler according to claim 1, further comprising:
   a first solenoid operated valve located between the vacuum pad and a vacuum pump; and
   a second solenoid operated valve located between atmosphere and the vacuum pad.

7. A vacuum handler comprising:
   a harness including a hinge and one or more pinned connections, the harness configured for connecting a portion of a vacuum pad of the vacuum handler to a vacuum beam of the vacuum handler;
   an actuatable cylinder connecting another portion of the vacuum pad to the vacuum beam;
   wherein operation of the actuatable cylinder rotates the vacuum pad about the hinge;
   wherein a plane of rotation of the hinge is oriented perpendicular to a plane of rotation of the one or more pinned connections.

8. A vacuum handler according to claim 7, wherein the one or more pinned connections provide lateral movement of the vacuum pad relative to the vacuum beam.

9. A vacuum handler according to claim 7, the actuatable cylinder including a hydraulic cylinder.

10. A vacuum handler according to claim 7, wherein the vacuum beam is a boom-mountable vacuum beam.

11. A vacuum handler according to claim 7, further comprising:
    a first solenoid operated valve located between the vacuum pad and a vacuum pump; and
    a second solenoid operated valve located between atmosphere and the vacuum pad.

12. A method for moving pipe using a vacuum handler connected to a boom, the method comprising;
    changing an angle of a vacuum pad of the vacuum handler relative to a vacuum beam by operating an actuatable cylinder connecting one portion of the vacuum pad to a vacuum beam and thereby rotating the vacuum pad relative to a harness pivotally connecting another portion of the vacuum pad to the vacuum beam, the harness including a hinge and one or more pinned connections.

13. A method according to claim 12, further comprising creating a vacuum between the vacuum pad and the pipe.

14. A method according 13, wherein the creating the vacuum includes:
    opening a first solenoid operated valve located between the vacuum pad and a vacuum pump; and
    closing a second solenoid operated valve located between atmosphere and the vacuum pad.

15. A method according to claim 14, further comprising releasing the vacuum between the vacuum and the pipe.

16. A method according to claim 15, wherein the releasing includes:

closing the first solenoid operated valve; and
opening the second solenoid operated valve.

17. A method according to claim 12, wherein a plane of rotation of the hinge is oriented perpendicular to a plane of rotation of the one or more pinned connections.

18. A vacuum handler according to claim 12, wherein the one or more pinned connections provide lateral movement of the vacuum pad relative to the vacuum beam.

* * * * *